United States Patent [11] 3,600,972

[72] Inventor Eric John Elliott
St. Albans, England
[21] Appl. No. 1,756
[22] Filed Jan. 9, 1970
[45] Patented Aug. 24, 1971
[73] Assignee English Numbering Machines Limited
London, England
[32] Priority Jan. 18, 1969
[33] England
[31] 3,050/69

[54] DEVICE INCLUDING MEANS FOR SETTING A FIRST ROTATABLE MEMBER RELATIVE TO A SECOND ROTATABLE MEMBER
2 Claims, 4 Drawing Figs.
[52] U.S. Cl. .................................................. 74/527, 74/89.15, 33/164 R
[51] Int. Cl. ....................................................... G05g 5/06, F16h 27/02
[50] Field of Search ......................................... 74/89.15, 527; 33/164

[56] References Cited
UNITED STATES PATENTS
1,385,405  7/1921  Tangen ........................ 33/164
2,560,850  7/1951  Day ............................. 74/527
2,612,051  9/1952  Felt ............................. 74/527
2,665,489  1/1954  Cunningham ................ 33/164
2,680,992  6/1954  Herbain ....................... 33/164
3,091,866  6/1963  Kachergis .................... 33/164
3,386,312  6/1968  Weasler ....................... 74/527

Primary Examiner—Milton Kaufman
Assistant Examiner—Wesley S. Ratliff, Jr.
Attorney—Nolte and Nolte ABSTRACT: A first annular member keyed to a shaft is provided internally with regularly spaced axial grooves, and a second annular member concentric with the shaft is provided internally with regularly spaced axial grooves. The angular positions of the individual annular members are determined and their resulting relative angular setting accurately effected by arranging a ridge on the circumference of a sleeve to engage aligned grooves on the first and second annular members. The number of grooves on the first and second annular members differs to give a Vernier effect. One the sleeve effects the setting, the shaft and the second annular member are coupled to be rotatable relative to a common reference point.

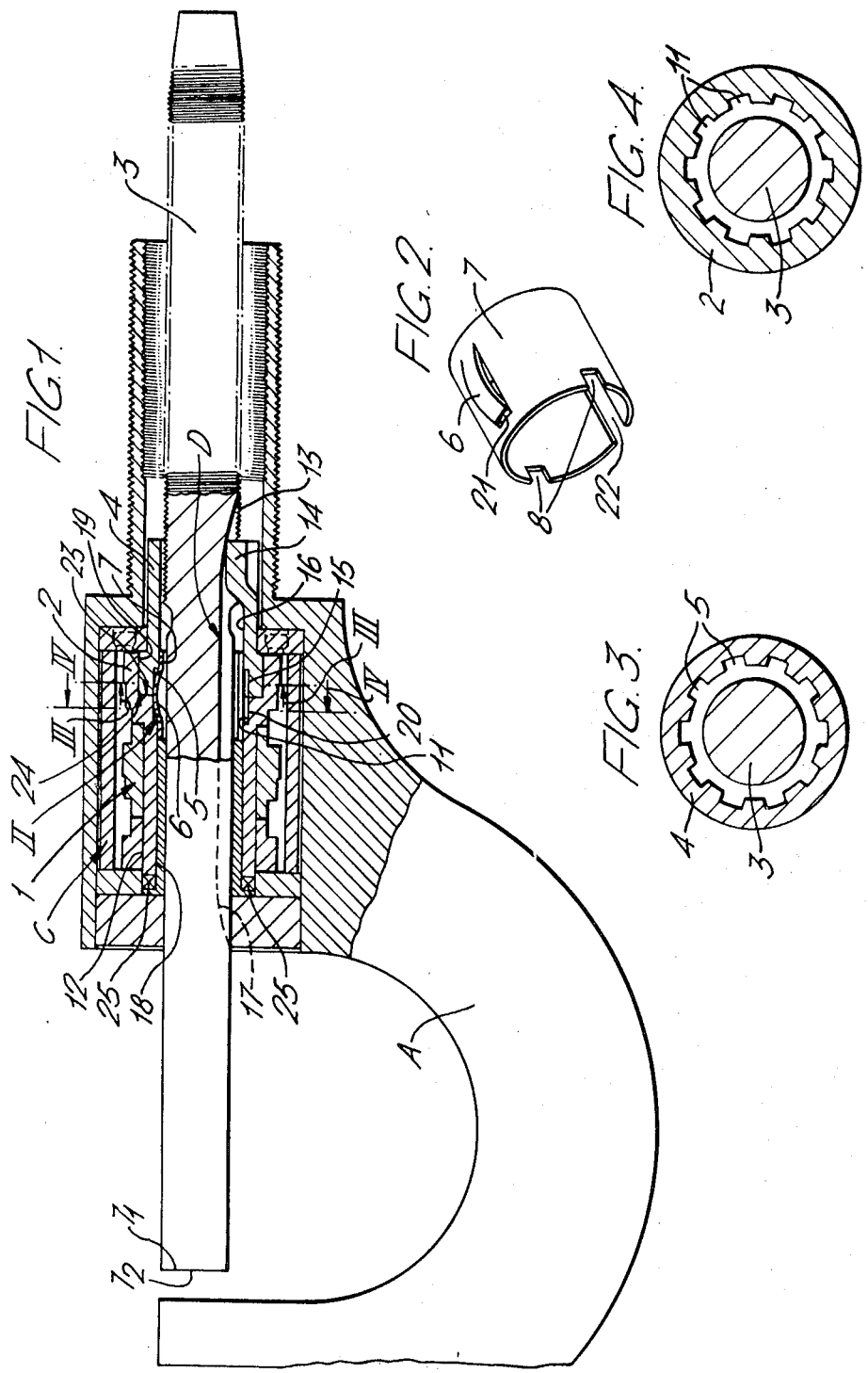
INVENTOR
ERIC JOHN ELLIOTT
BY Nolte & Nolte
ATTORNEYS

3,600,972

DEVICE INCLUDING MEANS FOR SETTING A FIRST ROTATABLE MEMBER RELATIVE TO A SECOND ROTATABLE MEMBER

BACKGROUND TO THE INVENTION

This invention relates to a device including means for setting a first rotatable member relative to a second rotatable member.

An example of such a device is a micrometer, where it is necessary to ensure that the zero setting of the micrometer spindle corresponds to a zero reading on the micrometer measuring or counter unit. Hitherto, difficult adjustments have been required in some cases necessitating further machine work being carried out to bring components into accurate alignment.

SUMMARY OF THE INVENTION

According to one feature of the invention there is provided a device including means for setting a first rotatable member relative to a second rotatable member comprising, a shaft providing said first rotatable member, a first annular member having a first axially extending bore and rotatable with said shaft, at least a portion of the first axially extending bore being of such diameter relative to the diameter of the shaft adjacent thereto to allow a clearance between the shaft and the first annular member along said portion of the bore, a first plurality of grooves regularly spaced around the periphery of said bore portion, a second annular member having a second axially extending bore providing said second rotatable member and arranged to be coaxial with said shaft, the diameter of said second axially extending bore allowing clearance along the entire length of said second bore between the second annular member and the shaft, a second plurality of grooves different in number from said first plurality of grooves being regularly spaced around the periphery of said second bore, a sleeve fitting and displaceable along said shaft, a ridge on the outer periphery said sleeve engageable with aligned ones of said first and second plurality of grooves, whereby the relative angular setting of the second rotatable member relative to the first rotatable member may be effected by aligning first groove in the first annular member with a second groove in the second annular member and locating the ridge of said sleeve member in said aligned grooves.

Preferably, the ridge on said sleeve is formed by a resilient strip extending from the wall of the sleeve whereby the ridge is located in the aligned first and second grooves by rotating the sleeve about the shaft until the ridge is resiliently displaced into said aligned grooves.

According to a second feature of the invention there is provided an arrangement for setting a rotatable member relative to another rotatable member, comprising a rotatable substantially cylindrical driving member and a rotatable substantially cylindrical driven member, a first plurality of regularly spaced axially extending grooves provided on a bearing surface of the driving member, an axially extending ridge provided on a bearing surface of the driven member engageable with a selectable one of the grooves of the driving member, a substantially cylindrical member, drivable by the driven member, a second plurality of regularly spaced axially aligned grooves provided on a bearing surface of the drivable member, the number of the first plurality of grooves differing from the number of the second plurality of grooves, wherein for setting the angular position of the driving member relative to the drivable member the ridge of the driven member is inserted into aligned grooves on the driving and drivable members.

The bearing surface of the driven member may be formed by its outer peripheral surface, and the bearing surfaces of the driving and drivable member may be formed by their inner peripheral surfaces.

Advantageously, the ridge on the driven member is formed from a strip of resilient material extending from a slot or recess in the wall of the driven member so that the ridge is engaged by the aligned grooves of the driving and drivable members after rotating the driven member until the ridge is resiliently urged into said aligned grooves.

Preferably, the wall of the driven member is provided at one end with a pair of diametrically opposed recesses by means of which the driven member can be rotated to align said ridge with the aligned grooves of the driving and drivable members.

Preferably, the driven member is provided with an axially extending slot along the length of its wall, the slot being diametrically opposite the ridge. Advantageously, the number of said first plurality of grooves differs from the number of the second plurality of grooves by one.

The driving member may be keyed to a rotatable shaft.

Preferably, the drivable member is provided at one end with a pair of diametrically opposed recesses by means of which the angular position of the drivable member relative to the driving member can be determined prior to the setting of said angular position by insertion of said ridge.

The first and second pluralities of axially extending grooves may extend from radial end faces on the driving and drivable member which are arranged to abut one another.

Preferably, said first and second pluralities of grooves extend along limited bore portions of the driving and drivable members which have equal diameter.

The invention also includes a micrometer provided with such an arrangement.

DESCRIPTION OF THE DRAWINGS

The aforegoing and further aspects of the invention will now be described with reference to the accompanying drawings which show an arrangement of the invention applied to a digital micrometer. In the drawings:

FIG. 1 shows a side view of a micrometer partly in section;

FIG. 2 shows a perspective somewhat diagrammatical view of a component of the micrometer of FIG. 1;

FIG. 3 shows a section on the line III–III of FIG. 1; and

FIG. 4 shows a section on the line IV–IV of FIG. 1, some parts being omitted in FIGS. 3 and 4.

DETAILED DESCRIPTION OF THE EMBODIMENT

The micrometer illustrated in FIG. 1 comprises a counter unit C incorporated in an anvil A and coupled by an assembly unit D to an operating spindle or shaft 3.

The counter unit C is required to register a zero reading when the measurement face $F_1$ of the spindle 3 is set to contact the measurement face $F_2$ of the anvil in known manner.

The assembly unit D which will be described hereinafter facilitates the assembly of the micrometer in a manner which allows the counter unit C to be set to register a zero reading when the measurement face $F_1$ of the shaft 3 contacts the measurement face $F_2$ of the anvil A, simply and accurately.

The counter unit C comprises a plurality of rotatable number wheels generally designated 1 which are coupled, for example, by pinnions (not shown) in the manner of known digital counters. The counter unit C is driven through a unit wheel 2 which provides a bearing surface 12 about which the other number wheels rotate.

The assembly unit D couples the shaft 3 to the unit wheel 2 in a manner such that the counter unit C gives a digital indication of the separation between the faces $F_1$ and $F_2$.

The assembly unit D includes the shaft 3, a driving member 4, a driven member 7 and a drivable member consisting of the unit wheel 2. The spindle 3 which extends through the counter unit C, is manually rotatable to adjust the separation between the faces $F_1$ and $F_2$ in known manner, as is indicated by the screw thread 13.

The driving member 4 which surrounds a part of the shaft 3 comprises an annular member which is substantially cylindrical and has an axially extending bore 16. The driving member 4 is keyed to the shaft 3 by means of a keylike projection 14 sliding in an axially extending slot 17 on the outer periphery of the shaft 3 during adjustment of the separation between the faces $F_1$ and $F_2$. A bore portion 15 remote from the key 14 is of such diameter relative to the diameter of the shaft adjacent thereto to allow a clearance between the outer periphery of the shaft 3 and the inner periphery of the annular member 4. The bore portion 15 is provided with regularly spaced axially extending grooves 5 (FIG. 3).

The unit wheel 2 comprising the drivable member of the assembly unit D is formed by a second annular member which is substantially cylindrical and has an axially extending bore 18 coaxial with the shaft 3. Referring to FIG. 1 the bore of unit wheel 2 has a portion 19 of increased diameter which surrounds in part the driving member 4. A further portion 20 of the bore of the unit wheel 2 is provided with regularly spaced axially extending grooves 11 (FIG. 4). A clearance between the inner periphery of the unit wheel 2 and the circumference of the shaft 3 allows sleeve 7 to be inserted between the driving member 4 and the shaft 3. The sleeve 7 is provided at its outer periphery with an axially extending ridge 6 (FIG. 2). The ridge 6 is engageable with the grooves 5 in the driving member 4 and with the grooves 11 in the unit wheel 2. At one end of the sleeve 7, diametrically opposed recesses 8 are provided in the wall of the sleeve 7 by means of which a suitable tool can engage the sleeve 7 to rotate the same about the shaft 3. The ridge 6 is provided by means of an axially extending strip stamped out of the wall forming the sleeve 7 and severed at one end so that the ridge is resiliently depressible into the slot 21 from which the strip extends. The wall of the sleeve 7 is provided with an axially extending slit 22 diametrically opposite the ridge 6 which allows slight deformation of the sleeve. The bore portion 15 of the driving member 4 extends a limited distance along the bore 16 from a radial end face 23. Likewise, the bore portion 20 of the drivable member 2 extends a limited distance along the bore 18 from a radial end face 24. The radial end faces 23 and 24 are arranged to abut one another and the bore portions 15 and 20 are of equal diameter. The number of the grooves 11 differs from the number of grooves 5 by one. A pair of diametrically opposed recesses 25 are provided at the end of the drivable member 2 by means of which the drivable member may be rotated.

The operation of the assembly unit during setting of the micrometer is as follows:

The micrometer is arranged with the driven member or sleeve 7 so displaced (to the left in FIG. 1) that the drivable member or unit wheel 2 and the driving member 4 are displaceable relative to one another. The micrometer is set to its initial position, in which the faces $F_1$ and $F_2$ are in contact, by rotation of the operating spindle or shaft 3. Since the driving member 4 is keyed to the shaft 3 its angular position is fixed. By means of a suitable tool engaging the recesses 25 thereof, the unit wheel or drivable member 2 is set so that the counter unit reads zero, determining the angular position of the drivable member 2 relative to the driving member 4 prior to the setting of this position by the driven member 7. By means of a second tool which engages the recesses 8, the sleeve 7 is displaced to the right in FIG. 1, along the shaft 3 to the axial position shown. At this stage, because the clearance between the bore of the drivable member 2 and the shaft 3 is limited, the ridge 6, is depressed into the slit 21. Owing to the difference in number between the grooves 11 and the grooves 5, only one of the grooves 11 and one of the grooves 5, are aligned. By rotation of the driven member or sleeve 7, the ridge 6 is aligned with the aligned grooves which enables the ridge 6 to be resiliently urged out of the slit 21 into the aligned ones of the grooves 11 and 5. Thereby, the driving member 4 is coupled to the driven member 7, which in turn couples the driven member to the drivable member or unit wheel 2.

It will be appreciated that owing to the fact that the number of grooves 11 and the grooves 5 differ by one, a kind of Vernier effect is obtained so that for any angular position of the drivable member 2 relative to the driving member 4, the coupling between them can be set accurately by the ridge 6.

I claim:

1. A device including means for setting a first rotatable member relative to a second rotatable member comprising,
    a shaft providing said first rotatable member,
    a first annular member having a first axially extending bore and rotatable with said shaft,
    at least a portion of the first axially extending bore being of such diameter relative to the diameter of the shaft adjacent thereto to allow a clearance between the shaft and the first annular member along said portion of the bore,
    a first plurality of grooves regularly spaced around the periphery of said bore portion,
    a second annular member having a second axially extending bore providing said second rotatable member and arranged to be coaxial with said shaft,
    the diameter of said second axially extending bore allowing clearance along the entire length of said second bore between the second annular member and the shaft,
    a second plurality of grooves different in number from said first plurality of grooves being regularly spaced around the periphery of said second bore,
    a sleeve fitting and displaceable along said shaft, a ridge on the outer periphery said sleeve engageable with aligned ones of said first and second plurality of grooves,
    whereby the relative angular setting of the second rotatable member relative to the first rotatable member may be effected by aligning a first groove in the first annular member with a second groove in the second annular member and locating the ridge of said sleeve member in said aligned grooves.

2. A device as defined in claim 1, wherein the ridge on said sleeve is formed by a resilient strip extending from the wall of the sleeve whereby the ridge is located in the aligned first and second grooves by rotating the sleeve about the shaft until the ridge is resiliently displaced into said aligned grooves.